United States Patent
Keohane et al.

(10) Patent No.: US 8,352,556 B2
(45) Date of Patent: *Jan. 8, 2013

(54) CONDITIONED DELIVERY OF ELECTRONIC MAIL

(75) Inventors: Susann Marie Keohane, Austin, TX (US); Gerald Francis McBrearty, Austin, TX (US); Shawn Patrick Mullen, Buda, TX (US); Jessica Murillo, Hutto, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 382 days.

This patent is subject to a terminal disclaimer.

(21) Appl. No.: 12/176,393

(22) Filed: Jul. 20, 2008

(65) Prior Publication Data

US 2008/0288601 A1 Nov. 20, 2008

Related U.S. Application Data

(63) Continuation of application No. 10/640,849, filed on Aug. 14, 2003, now Pat. No. 8,275,838.

(51) Int. Cl.
*G06F 15/16* (2006.01)
(52) U.S. Cl. .................. 709/206; 709/207
(58) Field of Classification Search ........... 709/204–207
See application file for complete search history.

(56) References Cited

U.S. PATENT DOCUMENTS

| | | | | |
|---|---|---|---|---|
| 6,021,433 A | 2/2000 | Payne et al. | ............ | 709/219 |
| 6,073,142 A * | 6/2000 | Geiger et al. | ............ | 715/205 |
| 6,076,101 A | 6/2000 | Kamakura et al. | ....... | 709/206 |
| 6,199,102 B1 | 3/2001 | Cobb | ............ | 709/206 |
| 6,507,866 B1 * | 1/2003 | Barchi | ............ | 709/207 |
| 6,854,007 B1 | 2/2005 | Hammond | ............ | 709/206 |
| 6,868,498 B1 * | 3/2005 | Katsikas | ............ | 726/14 |
| 7,380,126 B2 * | 5/2008 | Logan et al. | ............ | 713/176 |
| 2002/0019852 A1 * | 2/2002 | Bahar | ............ | 709/206 |
| 2002/0026488 A1 | 2/2002 | Ogawa | ............ | 709/206 |
| 2002/0075521 A1 | 6/2002 | Oobayashi | ............ | 358/402 |
| 2002/0095508 A1 | 7/2002 | Okazawa | ............ | 709/230 |
| 2002/0143879 A1 | 10/2002 | Sommerer | ............ | 709/206 |
| 2002/0144148 A1 * | 10/2002 | Hashem et al. | ............ | 713/201 |
| 2003/0009383 A1 | 1/2003 | Mori et al. | ............ | 705/22 |
| 2003/0023695 A1 | 1/2003 | Kobata et al. | ............ | 709/206 |
| 2003/0110223 A1 | 6/2003 | Hamilton et al. | ............ | 709/206 |

(Continued)

OTHER PUBLICATIONS

Network working Group Request of Comments: RFC—2298 R. Fajman (national institues of health) Mar. 1998.*

(Continued)

*Primary Examiner* — Patrice Winder
*Assistant Examiner* — Tauqir Hussain
(74) *Attorney, Agent, or Firm* — Matthew B. Talpis; Gregory K Goshorn; Greg Goshorn, P.C.

(57) ABSTRACT

A system and method for conditioned distribution of e-mail is provided. Delivery of an e-mail message to selected second recipients (equivalently addressees) may be conditioned on a set of preselected conditions, in particular to a set of conditions associated with the delivery of the e-mail to a set of first recipients. In response to message delivery notifications corresponding to the set of first recipients, a determination is made if the delivery conditions are satisfied, and delivery to the set of second recipients made accordingly. Delivery to a set of third recipients may be likewise conditioned on another set of conditions.

24 Claims, 3 Drawing Sheets

U.S. PATENT DOCUMENTS

| | | | |
|---|---|---|---|
| 2003/0172120 A1 | 9/2003 | Tomkow et al. | 709/206 |
| 2003/0191969 A1* | 10/2003 | Katsikas | 713/201 |
| 2004/0003283 A1 | 1/2004 | Goodman et al. | 713/201 |
| 2004/0003352 A1* | 1/2004 | Bargeron et al. | 715/530 |
| 2004/0172454 A1 | 9/2004 | Appelman et al. | 709/206 |
| 2005/0015450 A1 | 1/2005 | Keohane et al. | 709/206 |
| 2005/0177622 A1 | 8/2005 | Spielman et al. | 709/206 |
| 2006/0195537 A1 | 8/2006 | Petry et al. | 709/206 |
| 2006/0195554 A1 | 8/2006 | Payne et al. | 709/219 |
| 2008/0071928 A1 | 3/2008 | Okudera | 709/245 |

OTHER PUBLICATIONS

Greg Alwang, "Really Secure E-Mail Plug-In, SurfControl's SuperScout Email Filter," *PC Magazine*, p. 42 (Jun. 26, 2001).

Susanne Bjorner, "Day Tripping to Internet World. (Fall 1996 Trade Show)" *Searcher*, vol. 5, No. 2, p. 50(12) (Feb. 1997).

\* cited by examiner

CONDITIONED DELIVERY OF ELECTRONIC MAIL

CROSS REFERENCE TO RELATED APPLICATIONS

The present application is a continuation application of pending U.S. patent application Ser. No. 10/640,849, which was filed on Aug. 14, 2003 now U.S. Pat. No. 8,275,838, which is assigned to the assignee of the present invention. The present invention claims priority benefits to U.S. patent application Ser. No. 10/640,849.

TECHNICAL FIELD

The present invention relates in general to data processing systems, and in particular, for electronic mail client systems including mechanisms for automatically controlling the delivery of e-mail to selected recipients based on criteria set by the sender.

BACKGROUND INFORMATION

Electronic mail (e-mail) processing in modern data processing systems are typically based on a client/server model. An e-mail client, usually deployed on a user's workstation or personal computer receives user input and generates an e-mail message which is typically transferred to the server, generically referred to as a mail transfer agent (MTA). The MTA then transfers the mail to one or more intermediate MTAs and ultimately to an MTA corresponding to the recipient of the e-mail message (as determined by the e-mail address of the addressee). Transfer of the e-mail message commonly uses the Simple Mail Transfer Protocol (SMTP).

In accordance with these e-mail protocols, a user may request confirmation of delivery of the e-mail to a recipient's mailbox, or confirmation that the e-mail has been opened by the recipient. Typically an e-mail client allows a user to selectively enable these delivery confirmation options. However, there is no mechanism to customize the delivery of e-mail.

In some circumstances, it may be desirable to control the distribution of an e-mail message to selected recipients. For example, the e-mail message may include sensitive information that should be distributed to and read by a particular set of recipients before being distributed more widely. Consider, within an enterprise, the distribution of an e-mail announcement concerning organizational changes within the enterprise. It may be desirable to distribute the announcement first to managers within the enterprise, then to employees affected by the changes and lastly to all employees. It may be further desired to delay distribution to one or more of the categories of recipients based on the delivery status of prior recipients.

As noted above, e-mail protocols provide for delivery confirmation, options to be selected by the user. However, there is a need in the art for systems and methods for controlling the distribution of e-mail among recipients in response to user-specified conditions.

SUMMARY OF THE INVENTION

The aforementioned needs are addressed by the present invention. Accordingly, there is provided in one embodiment of the present invention a method for conditional delivery of e-mail. The method includes transmitting a first e-mail message to one or more first addressees. Message delivery notifications corresponding to a delivery status of said first e-mail message with respect to corresponding ones of said one or more addressees are received. In response to these, it is determined if a preselected set of conditions for delivery of said e-mail message to one or more second addressees is satisfied.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
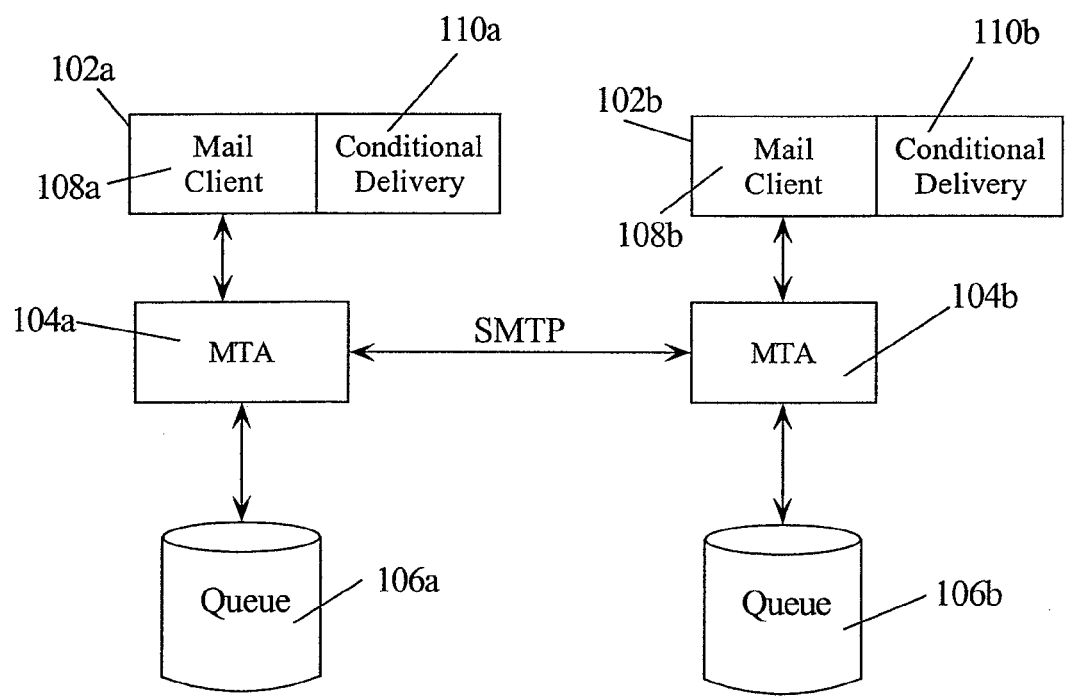
FIG. 1 illustrates an architecture for e-mail messaging which may be used in conjunction with the principles of the present invention.

A mechanism for conditioned distribution of e-mail is provided. Delivery of an e-mail message to selected second recipients (equivalently addressees) may be conditioned on a set of preselected conditions, in particular to a set of conditions associated with the delivery of the e-mail to a set of first recipients. In response to message delivery notifications corresponding to the set of first recipients, a determination is made if the delivery conditions are satisfied, and delivery to the set of second recipients made accordingly. Delivery to a set of third recipients may be likewise conditioned on another set of conditions.

In the following description, numerous specific details are set forth such to provide a thorough understanding of the present invention. For example, particular e-mail transport protocols may be referred to, however, it would be recognized by those of ordinary skill in the art that the present invention may be practiced without such specific details, and in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

FIG. 1 schematically illustrate e-mail exchange architecture which may be used in conjunction with the present invention. The e-mail exchange architecture illustrated in FIG. 1 includes mail clients 102a and 102b. A mail client typically provides the user interface to an e-mail exchange system. E-mail clients may be stand-alone applications such as Eudora a well-known cross-platform e-mail client. Additionally, Unix and Unix-like platforms, such as Linux, provide e-mail clients such as Pine and Mutt. On Windows platforms, Microsoft Outlook includes an e-mail client. Messages generated by the user for transmission, typically via a network, to the mail addressee are sent to a Mail Transfer Agent (MTA), typically using the Simple Mail Transfer Protocol (SMTP). The architecture of FIG. 1, two MTAs, 104a and 104b are illustrated. MTAs queue e-mail messages for relay toward the destination. MTA 104a maintains queue 106a and MTA 104b maintains queue 106*b*. Additionally, as discussed in conjunction with FIG. 2 below, an MTA may queue e-mail the delivery of which is conditioned, and whose delivery is pending while the conditions remain unsatisfied. Mail is forwarded between MTAs, typically using the SMTP. Thus, an e-mail sent by a user of mail client 102*a*, for example, may generate an e-mail message addressed to the user of mail client 102*b*, such message may be transferred first to MTA 104*a* which may queue the message in queue 106*a*. The message may then be forwarded to MTA 104*b* which provides the egress mail server for mail client 102*b*. It would be appreciated by those of ordinary skill in the art that the architecture of FIG. 1 is exemplary, and in particular, the typical routing of an e-mail message may include the relay of the message by more than two MTAs.

Mail clients, such as mail clients 102*a* and 102*b*, typically include a mechanism to selectively enable the user to specify delivery confirmation options, referred to as Delivery Status Notification (DSN). Often this is selected via a graphical user interface (GUI) (not shown) as for example in Microsoft® Outlook, but could be specified by a command or command keyword-value pair in a command-line interface (CLI), as in Pine. Additionally, RFC2298-compliant MUAs provide for optionally receiving a "read" notification, that may enable the return of a notification to the sender that the e-mail has been displayed on the recipient's PC or workstation. (RFCs are Internet documents which are used to promulgate Internet standards; RFCs are available from the Internet Engineering Task Force (http://www.ietf.org).) RFC2298 specifies an defines a MIME content-type that may be used by a MUA or electronic mail gateway to report the disposition of a message after it has been successfully delivered to a recipient. In particular, RFC2298 provides specifications for an extensible message format for message delivery notifications (MDNs). A specification for DSNs is provided in RFC 1894. (A DSN is requested in the SMTP transaction between the sender's e-mail client and the sender's MTA, in accordance with RFC1891, SMTP Service Extension for Delivery Status Notifications.) A DSN does not report on the disposition of an e-mail once it is delivered to the recipient's MUA, but only provides information on the success or failure of the delivery of the e-mail to the recipient's MUA. As noted above, an MDN may be requested for that purpose. Such notification mechanisms may be used in conjunction with the controlled distribution of e-mail in accordance with the principles of the present invention, as discussed below. These may be used by a conditional delivery system which may be incorporated in an MUA, such as conditional delivery system 110*a* and 110*b*, in accordance with the present invention.

Figure 2:
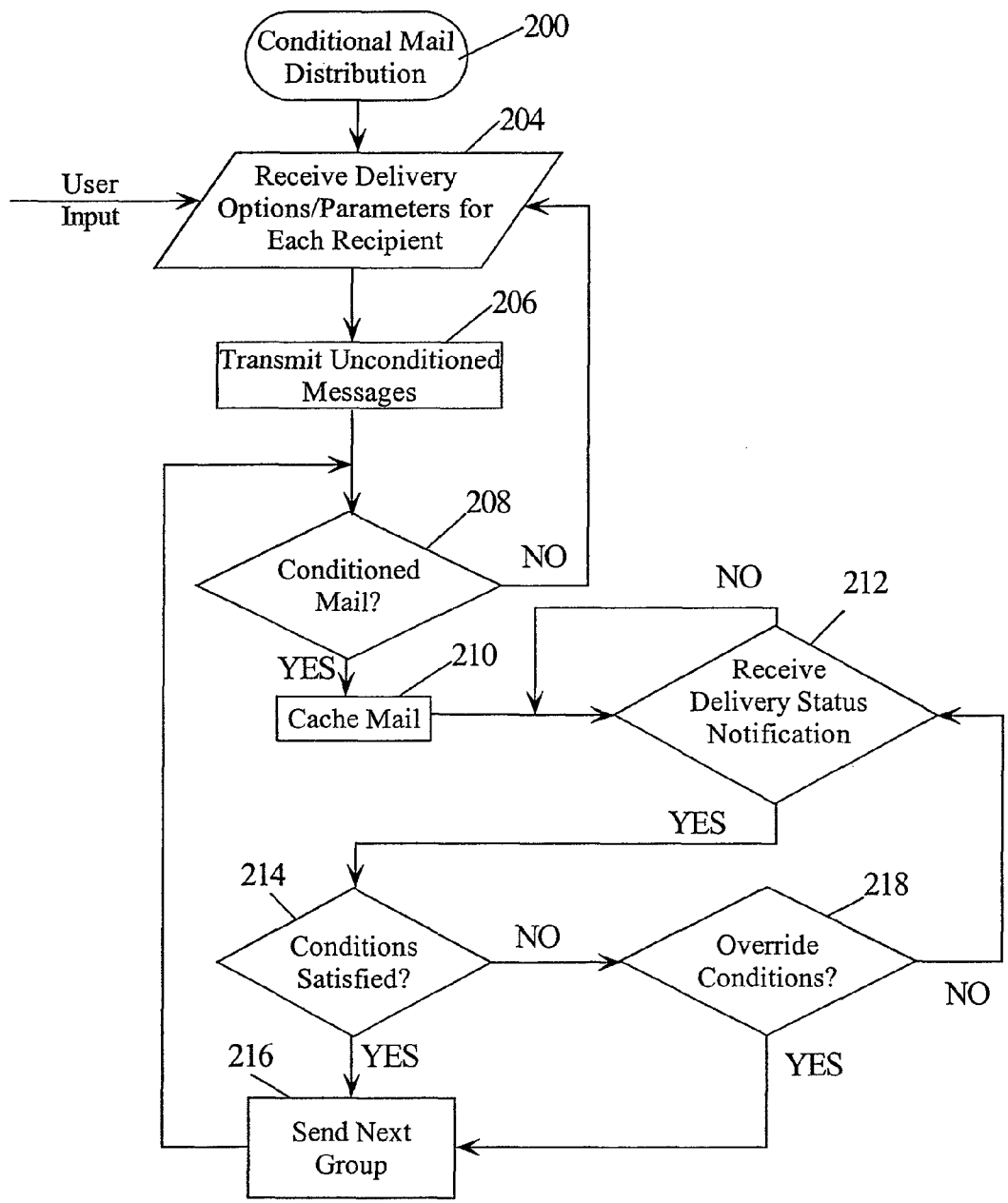
FIG. 2 illustrates, in flowchart form, a methodology for controlling distribution of e-mail among recipients.

Refer now to FIG. 2 which illustrates, in flowchart form, a methodology 200 for providing conditional distribution of e-mail in accordance with an embodiment of the present invention. Methodology 200 may be used by a conditional delivery module in an MUA, such as conditional delivery module 110*a, b* FIG. 1.

Note that the flowcharts provided herein are not necessarily indicative of the serialization of operations being performed in an embodiment of the present invention. Steps disclosed within these flowcharts may be performed in parallel. The flowcharts are indicative of those considerations that may be performed to produce the operations available to provide controlled distribution of e-mail based on user-specified criteria. It is further noted that the order presented is illustrative and does not necessarily imply that the steps must be performed in the order shown.

User input specifying the delivery options and associated parameter values associated therewith are received in step 204. Delivery options may include a message priority and conditional delivery requirements. Present e-mail clients such as Outlook and Eudora provide for user selectable message priority set via a GUI based user input, an options dialog pane in Outlook and a popup list in Eudora. Such user interfaces may be similarly employed to enter delivery options and parameters specifying values for the conditional delivery of e-mail messages to particular recipients or groups of recipients. Conditions may be specified for each recipient or group of recipients. Such requirements may, for example, condition the delivery of a message to particular recipients or groups of recipients on the receipt of the message by other recipients, receipt of the message by a specified number of selected recipients or groups of recipients, or a specified fraction of a number of selected recipients. Conditions may also be measured by a number of messages opened by the selected recipients. Note that the present inventive principles may be applied to any set of conditions that may be associated with the delivery of e-mail to particular recipients or groups of recipients.

In step 206, unconditioned e-mail are transmitted to the recipients (i.e. addressees) of these messages. Note that the e-mail sent in step 206 may include a request for an MDN (in accordance with RFC2298, as noted above) to acknowledge the display of the message. Additionally, a Delivery Status Notification (DSN) may be requested in accordance with RFC1891. Whether either or both is requested depends on the conditional delivery requirements. For example, if the conditions include requirements with respect to the display of the message by the recipients of the e-mail sent in step 206, then an MDN may be requested. If the conditions include delivery requirements, then a DSN may be requested. If the conditions refer to both display and delivery, both an MDN and a DSN may be requested.

Unconditioned e-mail, are those e-mail that have no delivery conditions associated therewith. If there are no conditioned e-mail, process 200 returns to step 202 via step 208. Otherwise, if in step 208 there are conditioned e-mail, this mail is queued in step 210, pending satisfaction of the conditions, as described in conjunction with steps 212-218. Existing e-mail clients, such as Eudora include provisions for queuing e-mail messages for later transmission; additionally, e-mail clients such as Microsoft® Outlook include mechanisms for saving drafts of sent e-mail.

In step 212, process 200 loops, watching for DSNs and MDNs with respect to the e-mail sent in step 206. Step 212 may parse incoming messages to detect fields in the DSNs and MDNs. (DSNs and MDNs may collectively be referred to herein as "return receipts".) For example, the MIME subtype field in accordance with RFC2298 contains "disposition-notification" and the disposition-field contains a disposition-type, one value of which, "displayed" reflects that the subject e-mail has been displayed by an MUA reading the recipient's mailbox. Note that fields in an MDN conforming to RFC2298 are defined according to the rules of RFC822. RFC822, is the Internet e-mail standard. RFC822-compliant-header parsers are available in programming languages such as Java and Perl, and may be adaptable for use to parse a MDN conforming to RFC2298. Additionally, with respect to DSNs publicly available "bounced message parsers" may be adapted to determine receipt of an e-mail message by the addressee. One such parser is a regular expression based "bounced" mail parsers written in Perl for analyzing and reporting elements of RFC1894 DSN. This parser also may be adapted for parsing MDNs. (Such Perl modules may be found at the Comprehensive Perl Archive Network (CPAN) which is a central repository for Perl software (www.cpan.org). Artisans of ordinary skill would recognize that Perl is a scripting language particularly adapted for text processing and available across platforms.)

If, in step 212, a status notification is received, in step 214 it is determined if the conditions with respect to the conditioned e-mail are satisfied. For example, if the condition required that a specified percentage of the addressees of the e-mail sent in step 206 have opened that e-mail, in step 214, process 200 would calculate the percentage based upon a count of the number of delivery notifications received, and compare that value with the required value. If the condition is satisfied, in step 216 the conditioned mail is sent to the next recipient of recipient group. Note that the content of the conditioned mail need not the same as the content of the mail upon which the delivery of the mail in step 216 is conditioned. In other words, the messages may, or may not be the same. The conditions set for the delivery of the e-mail to the next set of recipients, and the determination that the conditions have been satisfied does not depend on the contents of the messages themselves. Of course, the rationale for conditioning the delivery of the e-mail may be predicated on the contents of the messages. For example, the sensitive nature of the contents may be the reason for conditioning the delivery of the e-mail.

Thus, in some circumstances, it may be desirable to control the distribution of an e-mail message to selected recipients. For example, the e-mail message may include sensitive information that should be distributed to and read by a particular set of recipients before being distributed more widely. Consider, within an enterprise, the distribution of an e-mail announcement concerning organizational changes within the enterprise. It may be desirable to distribute the announcement first to managers within the enterprise, then to employees affected by the changes and lastly to all employees. It may be further desired to delay distribution to one or more of the categories of recipients based on the delivery status of prior recipients.

Another example may arise in distributing organizational information When a second (that is, upper) line manager reads the note, the first line managers (lower) are then sent the note. When a first line manager read the note his/her department would then get the note.

Another application of the present invention may be to coordinate tasks in a projects. For example, in a code development project if there are several defects that all need to be fixed before the next level of code is built, then an email notification to the builders may be automatically deferred until the developers responsible for the corrective action received this email. Similarly, if a file has been modified by several different people and these modifications must be undone. an email may be sent asking each person to undo their change. However, rather than sending the note to everyone and making them coordinate making the changes manually, the mail would be delivered to each successive person that needs to undo modifications after each person reads the email reducing the need to manual coordinate the modifications.

Process 200 then returns to step 208, and continues to loop over steps 208-218 until all conditioned mail has been sent. Note that the conditions set for each set of conditioned e-mail may be different. If no such mail remains, process 200 returns to step 202.

Returning to step 214, based on the message delivery notifications, the delivery conditions have not been satisfied, in step 218, it is determined if the conditions are overridden. In other words, in step 218 it is determined if the conditioned mail should be sent although the conditions are not satisfied. Step 218 may, for example, be performed by the user's mail client (MUA) generating an dialog pane querying the user if he or she wants to send the conditioned mail although the conditions have not yet been satisfied. The use of such dialogs to alert or query users would be understood by persons of ordinary skill in the art. Similarly, a textual query may be displayed to the user in a command line interface based e-mail client. Note, that in an embodiment of the present invention, step 218 may be enabled via a delivery option/parameter specified by the user in step 204. If the conditioned messages are to be sent anyway, step 218 proceeds by the "Yes" branch to step 216. Otherwise, step 218 returns to step 212, and process 200 continues to receive message delivery notifications pending satisfaction of the delivery conditions.

Figure 3:
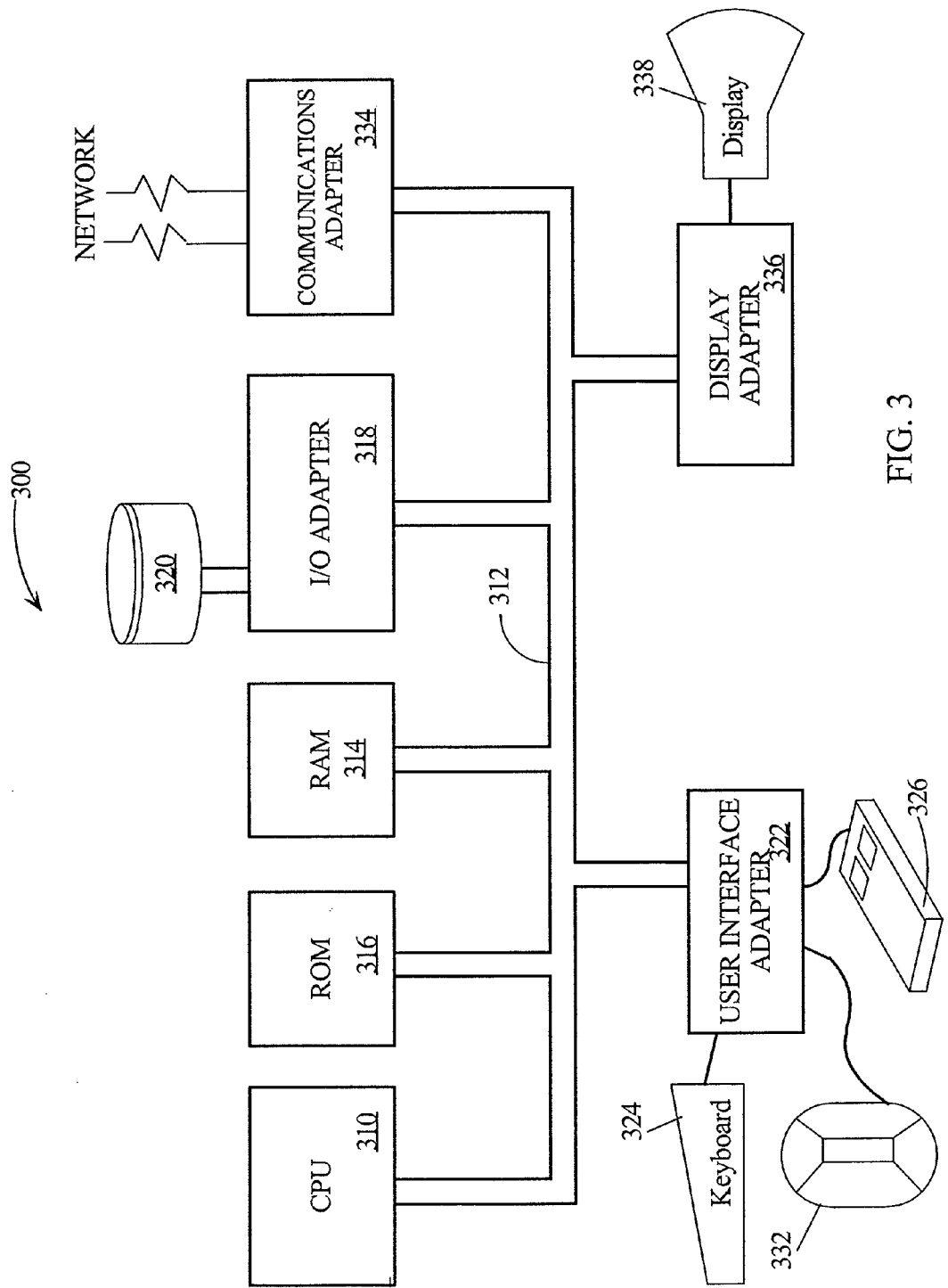
FIG. 3 illustrates, in block diagram form, a data processing system which may be used in conjunction with the methodologies incorporating the present inventive principles.

FIG. 3 illustrates an exemplary hardware configuration of data processing system 300 in accordance with the subject invention. The system in conjunction with the methodology illustrated in FIG. 2 may be used to provide controlled distribution of e-mail among selected recipients or groups of recipients. In particular system 300 may, in one embodiment may provide operations performed in an e-mail client with respect to receiving user input and setting e-mail delivery options in response thereto. In another embodiment system 300 may provide operations in a mail client with respect to the receipt of message delivery notifications and determining if delivery conditions have been satisfied. Data processing system 300 includes central processing unit (CPU) 310, such as a conventional microprocessor, and a number of other units interconnected via system bus 312. Data processing system 300 also includes random access memory (RAM) 314, read only memory (ROM) 316 and input/output (I/O) adapter 318 for connecting peripheral devices such as disk units 320 to bus 312, user interface adapter 322 for connecting keyboard 324, mouse 326, trackball 332 and/or other user interface devices such as a touch screen device (not shown) to bus 312. System 300 also includes communication adapter 334 for connecting data processing system 300 to a data processing network, enabling the system to communicate with other systems, and display adapter 336 for connecting bus 312 to display device 338. CPU 310 may include other circuitry not shown herein, which will include circuitry commonly found within a microprocessor, e.g. execution units, bus interface units, arithmetic logic units, etc. CPU 310 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 314 of one or more computer systems configured generally as described above. These sets of instructions, in conjunction with system components that execute them may control the distribution of e-mail among recipients (or sets of recipients in accordance with user-specified criteria as described hereinabove. Until required by the computer system, the set of instructions may be stored as a computer program product in another computer memory, for example, in disk drive 320 (which may include a removable memory such as an optical disk or floppy disk for eventual use in the disk drive 320). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Although the present invention and its advantages have been described in detail, it should be understood that various changes, substitutions and alterations can be made herein without departing from the spirit and scope of the invention s defined by the appended claims.

What is claimed is:

1. A method for conditional delivery of e-mail comprising;
    transmitting, by a sender, a first e-mail message to one or more first addressees;
    receiving, by the sender, one or more return receipts, the return receipts corresponding to a receipt status of said first e-mail message with respect to corresponding ones of said one or more addressees;
    selecting, by the sender, a first set of conditions corresponding to the transmitting of the first email message for the transmission of a second e-mail message to one or more second addresses, wherein the first addresses are different than the second addresses;
    determining, by the sender, in response to said return receipts, if the first set of conditions is satisfied; and
    in response to said first set of conditions being satisfied, sending said second e-mail message to said one or more second addressees.

2. The method of claim 1 further comprising queuing said second e-mail message for delivery to said one or more second addressees.

3. The method of claim 2 farther comprising receiving said first set of conditions for delivery of said second e-mail message to one or more second addressees in response to user input.

4. The method of claim 3 further comprising determining if said first set of conditions is overridden.

5. The method of claim 3 wherein said one or more first addressees comprises a plurality of addressees, and said first set of conditions comprises receipt of said first e-mail message by a first specified fraction of said plurality of first addressees.

6. The method of claim 5 wherein said first set of conditions further comprises display of said first e-mail message by a second specified fraction of said plurality of first addressees.

7. The method of claim 1 further comprising if, in response to one or more return receipts for said second e-mail message, a second set of conditions for delivery of a third message to one or more third addressees is satisfied, sending a third e-mail message to said one or more third addressees.

8. The method of claim 1 wherein a content of said second e-mail message differs from a content of said first e-mail message.

9. A computer program product for conditional delivery of e-mail comprising:
    a tangible storage medium, wherein the medium does not include signals;
    programming instruction, stored on the tangible storage medium for execution on a processor, for:
        transmitting a first e-mail message to one or more first addresses;
        selecting a first set of conditions corresponding to the transmitting of the first e-mail message for the transmission of a second e-mail message to one or more second addresses, wherein the first addresses are different than the second addresses;
        receiving one or more return receipt, the return receipts corresponding to a receipt status of said first e-mail message with respect to corresponding ones of said one or more addressees;
        determining, in response to said return receipts, if the first set of conditions is satisfied ; and
        in response to said first preselected set of conditions being satisfied, sending said second e-mail message to said one or more second addressees.

10. The program product of claim 9 further comprising programming instructions for queuing said second e-mail message for delivery to said one or more second addressees.

11. The program product of claim 10 further comprising programming instructions for receiving said first preselected set of conditions for delivery of said second e-mail message to one or more second addressees in response to user input.

12. The program product of claim 11 further comprising programming instructions for determining if first preselected set of conditions is overridden.

13. The program product of claim 11 wherein said one or more first addressees comprises a plurality of addressees, and said first preselected set of conditions comprises receipt of said first e-mail message by a specified fraction of said plurality of first addressees.

14. The program product of claim 13 wherein said first preselected set of conditions further comprises display of said first e-mail message by a second specified fraction of said plurality of first addressees.

15. The program product of claim 9 further comprising if, in response to one or more return receipts for said second e-mail message a second preselected set of conditions for delivery of a third e-mail message to one or more third addressees is satisfied, sending said third e-mail message to said one or more third addressees.

16. The program product of claim 9 wherein a content of said second e-mail message differs from a content of said first e-mail message.

17. A data processing system for conditional delivery of e-mail comprising:
    circuitry operable for transmitting a first e-mail message to one or more first addressees;
    circuitry operable for selecting a first set of conditions corresponding to the transmitting of the first email message for the transmission of a second e-mail message to one or more second addresses, wherein the first addresses are different than the second addresses;
    circuitry operable for receiving one or more return receipts, the return receipts corresponding to a receipt status of said first e-mail message with respect to corresponding ones of said one or more addressees;
    circuitry operable for determining, in response to said return receipts, if the first set of conditions is satisfied; and
    circuitry operable for, in response to said first preselected set of conditions being satisfied, sending said second e-mail message to said one or more second addressees.

18. The data processing system of claim 17 further comprising circuitry operable for queuing said second e-mail message for delivery to said one or more second addressees.

19. The data processing system of claim 18 further circuitry operable for receiving said first preselected set of conditions for delivery of said second e-mail message to one or more second addressees in response to user input.

20. The data processing system of claim 19 further comprising circuitry operable for determining if the first preselected set of conditions is overridden.

21. The data processing system of claim 19 wherein said one or more first addressees comprises a plurality of addressees, and said first preselected set of condition comprises receipt of said first e-mail message by a specified fraction of said plurality of first addressees.

22. The data processing system of claim 21 wherein said first preselected set of conditions further comprises display of said first e-mail message by a second specified fraction of said plurality of first addressees.

23. The data processing system of claim 17 further comprising circuitry operable for, in response to one or more return receipts for said second e-mail message if a second preselected set of conditions for delivery of a third e-mail message to one or more third addressees is satisfied, sending said third e-mail message to said one or more third addressees.

24. The data processing system of claim 17 wherein a content of said second e-mail message differs from a content of said first e-mail message.

* * * * *